United States Patent
Yamaguchi et al.

(10) Patent No.: US 7,409,431 B2
(45) Date of Patent: Aug. 5, 2008

(54) SERVER APPARATUS, COMMUNICATIONS METHOD, PROGRAM FOR MAKING COMPUTER EXECUTE THE COMMUNICATIONS METHOD, AND COMPUTER-READABLE STORAGE MEDIUM CONTAINING THE PROGRAM

(75) Inventors: Kotaro Yamaguchi, Tokyo (JP); Kenji Maeda, Kanagawa (JP); Makoto Kobayashi, Tokyo (JP); Jin Sunata, Kanagawa (JP); Yoko Murase, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 923 days.

(21) Appl. No.: 10/660,640

(22) Filed: Sep. 12, 2003

(65) Prior Publication Data

US 2004/0111493 A1 Jun. 10, 2004

(30) Foreign Application Priority Data

| Sep. 13, 2002 | (JP) | ............................. 2002-269248 |
| Sep. 13, 2002 | (JP) | ............................. 2002-269249 |
| Sep. 8, 2003 | (JP) | ............................. 2003-315760 |

(51) Int. Cl.
*G06F 15/16* (2006.01)
*H04N 7/167* (2006.01)
*G06F 11/00* (2006.01)
*H04L 9/00* (2006.01)

(52) U.S. Cl. ....................... 709/207; 709/206; 709/203; 380/201

(58) Field of Classification Search ................. 709/203, 709/206; 725/22, 23, 24, 25
See application file for complete search history.

(56) References Cited

U.S. PATENT DOCUMENTS

| 5,699,511 | A | 12/1997 | Porcaro et al. ......... 395/185.08 |
| 6,591,289 | B1 * | 7/2003 | Britton ....................... 709/203 |
| 6,697,902 | B1 * | 2/2004 | Sugimoto ................... 710/305 |
| 7,020,797 | B2 * | 3/2006 | Patil ............................... 714/4 |
| 7,210,094 | B2 * | 4/2007 | Dovin et al. ................ 715/240 |
| 7,259,879 | B2 | 8/2007 | Yoshino |
| 2001/0039616 | A1 | 11/2001 | Kumagai |
| 2002/0087706 | A1 | 7/2002 | Ogawa |
| 2003/0158893 | A1 * | 8/2003 | Komatsu et al. ............ 709/203 |

FOREIGN PATENT DOCUMENTS

| JP | 2002-41910 | 2/2002 |
| JP | 2002-82912 | 3/2002 |
| JP | 2002-175323 | 6/2002 |

OTHER PUBLICATIONS

U.S. Appl. No. 10/660,654, filed Sep. 12, 2003, Kobayashi et al.

* cited by examiner

*Primary Examiner*—Ashok Patel
*Assistant Examiner*—Ashley D Turner
(74) *Attorney, Agent, or Firm*—Fitzpatrick, Cella, Harper & Scinto

(57) ABSTRACT

Upon receiving a request from a communications terminal, a server apparatus performs some processes and returns processing results to the communications terminal. Before returning the processing results, the server apparatus sends the communications terminal a response containing an address needed to acquire the processing results to prevent communications from being cut off due to a communications timeout which occurs, for example, if the processing on the server takes time.

6 Claims, 17 Drawing Sheets

✣ PLEASE ENTER YOUR INFORMATION.

NAME ( EM-SIZE )

FAMILY NAME [ ] — 602

GIVEN NAME [ ] — 603

PHONETIC TRANSCRIPTION ( EM-SIZE )

FAMILY NAME [ ] — 604

GIVEN NAME [ ] — 605

ZIP CODE ( 7 DIGITS )

[ ] — 606

ADDRESS ( EM-SIZE )

PREFECTURE

[ TOKYO ▼ ] — 607

CITY

[ ] — 608

ST. NO. / BLD.

[ ] — 609

PHONE NUMBER ( EN-SIZE )

[ ] — 610

E-MAIL ADDRESS ( EN-SIZE )

[ ] — 611

DELIVERY METHOD :
 ⦿ MAIL
 ○ HOME DELIVERY SERVICE — 612

DELIVERY DESTINATION :
 ⦿ SAME AS ORDERER
 ○ SPECIFY DESTINATION — 613

[ PROCEED ] — 614

[8] CANCEL ORDER — 615

[9] RETURN — 616

🎁 PLEASE ENTER THE DESIRED DELIVERY DESTINATION.

RECIPIENT NAME ( EM-SIZE )

FAMILY NAME [ ] — 702

GIVEN NAME [ ] — 703

PHONETIC TRANSCRIPTION ( EM-SIZE )

FAMILY NAME [ ] — 704

GIVEN NAME [ ] — 705

ZIP CODE ( 7 DIGITS )

[ ] — 706

ADDRESS ( EM-SIZE )

PREFECTURE

[ TOKYO ▼ ] — 707

CITY

[ ] — 708

ST. NO. / BLD.

[ ] — 709

PHONE NUMBER ( EN-SIZE )

[ ] — 710

E-MAIL ADDRESS ( OPTIONAL )

[ ] — 711

[ PROCEED ] — 712

[8] CANCEL ORDER — 713

[9] RETURN — 714

♪ PLEASE CONFIRM THE ESTIMATE
FOR ORDERED GOODS, ORDERER
INFORMATION,
AND DELIVERY DESTINATION.
 IF YOU CONFIRM THEM,
PLEASE PRESS THE ORDER BUTTON.

[¥] CHARGES

L-SIZE BORDERLESS ×15
  = ¥6000 ( TAX INCLUDED )

DELIVERY CHARGE
  = ¥400 ( TAX INCLUDED )

HANDLING FEE FOR SMALL PAYMENT
  = ¥200 ( TAX INCLUDED )

HANDLING FEE FOR ACCOUNT SETTLEMENT
  = ¥100 ( TAX INCLUDED )

CONSUMPTION TAX = ¥0

TOTAL = ¥1300

✿ ORDERER INFORMATION
MR. TARO ○×
〒123-4567
OTA-KU TOKYO ・・・・
0312345678
taro@print.ne.jp

🎁 DELIVERY DESTINATION
SAME AS ORDERED

[ ORDER ] — 802

[8] CANCEL ORDER — 803
[9] RETURN — 804

♥ THANK YOU FOR FILLING OUT THE ORDER FORM.
 YOU WILL RECEIVE AN E-MAIL NOTICE ABOUT ORDER ACCEPTANCE WHEN ORDERING PROCEDURES ARE COMPLETE : PLEASE VERIFY YOUR ORDER.
 ALSO, BY ACCESSING THIS PAGE AGAIN, YOU CAN CHECK THE CURRENT ORDER STATUS.
 YOU CAN BOOKMARK THIS PAGE ( AS A FAVORITE ) ON YOUR CELL PHONE.
 TO RETURN TO THE IMAGE VIEWING SCREEN, PRESS THE FINISH BUTTON.

[ FINISH ] — 902

♥ THANK YOU FOR USING OUR SERVICE.
YOUR ORDER HISTORY IS AS FOLLOWS:

USER NAME:
MR. TARO ○× — 1001
TIME OF ACCEPTANCE:
2002. 06. 06  15:18 — 1002
ORDERED GOODS:
L-SIZE BORDERLESS PRINTS — 1003
ORDER AMOUNT:
¥ 1300 — 1004
TO BE PAID AT:
△ SHOP — 1005
BILL NUMBER:
123456789 — 1006
DUE DATE:
2002. 06. 20 — 1007
PROCESS STATUS : YOUR ORDER IS BEING PROCESSED AT PRINT SITE
COMMODITY INFORMATION — 1008
L-SIZE BORDERLESS ×15
= ¥600 ( TAX INCLUDED ) — 1009
. . . .

FIG. 11

Date : Sat. 23 Jun 2001 02:34:56 +0900
From : PhotoSite <△△△@○×△.co.jp>
To : aaa@○○.ne.jp
Subject : E-MAIL NOTICE FOR CONFIRMATION
Error - to : △△△@○×△.co.jp
Content-Type : text / plain : charset = "ISO-2022-JP"
Content-Transfer-Encoding : 7bit DEAR MR. CANON, WE WOULD LIKE TO INFORM YOU OF
THE BILL NUMBER FOR AN ORDER PLACED BY MR. TARO.

BILL NUMBER :  1234567
DUE DATE : MM DD, 200x
ORDERED GOODS : PRINTS
ORDER AMOUNT : ¥ 999,999

PLEASE PAY AT XXXX LOCATED NEARBY.
  THE DATE WHEN YOU MAKE YOUR PAYMENT
WILL BECOME THE ORDER DATE.

YOU CAN CHECK ORDER DETAILS AND
ORDER STATUS AT THE FOLLOWING SITE :
http://www.image○×△.net/???=xxxxxxxxxx
  YOU CANNOT RETURN A RESPONSE DIRECTLY TO THIS MAIL.
  IF YOU DO NOT HAVE ANY IDEA WHY YOU HAVE RECEIVED
THIS MAIL OR IF YOU HAVE ANY QUESTION,
PLEASE CONTACT THE URL LISTED BELOW.
- - - END OF MESSAGE - - -

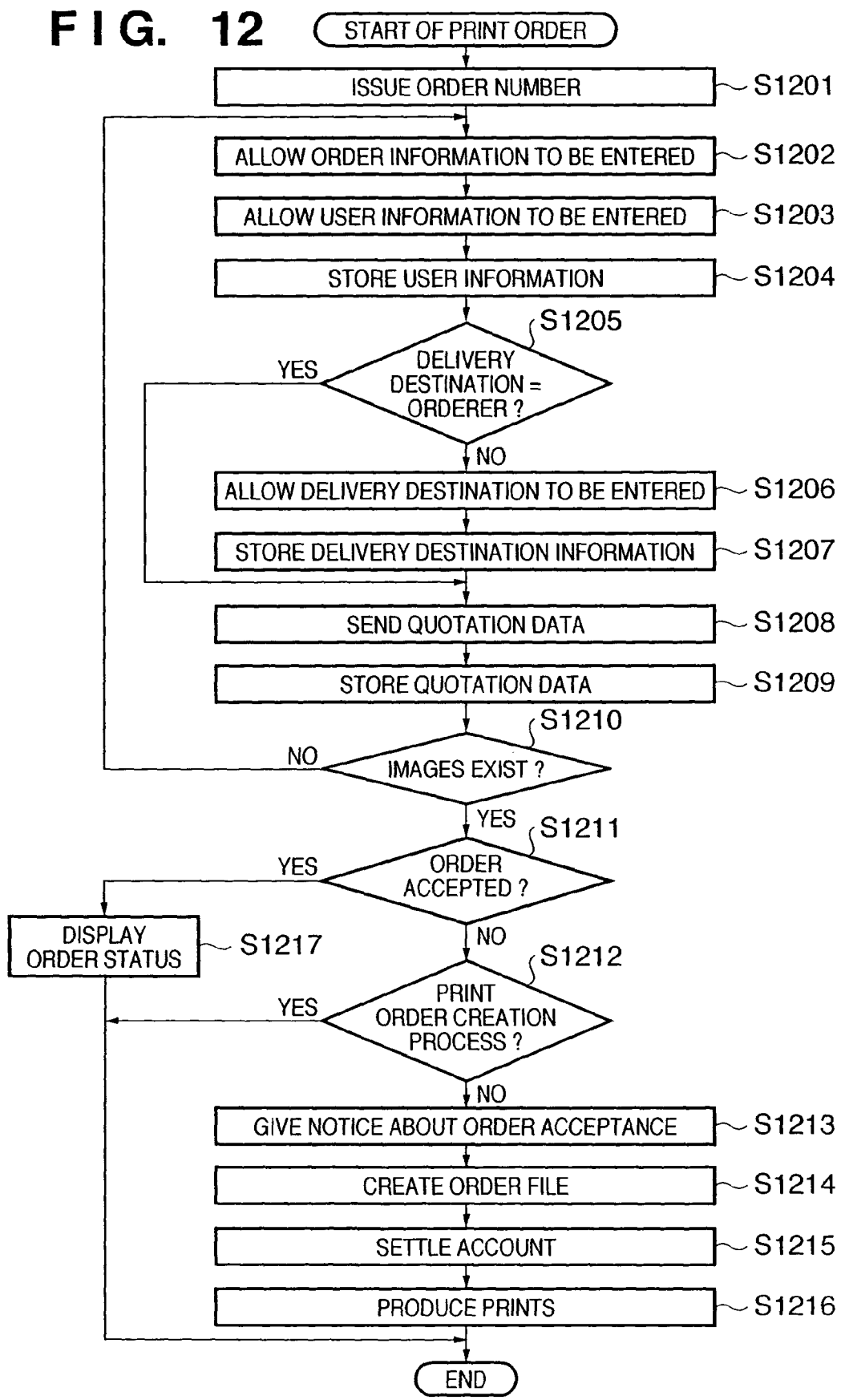

FIG. 14

ORDER INFORMATION DATA TABLE 1400

| FIELD | TYPE | |
|---|---|---|
| ORDER NUMBER | INTEGER | ~ 1401 |
| ORDERER ID | INTEGER | ~ 1402 |
| RECIPIENT NAME | CHAR [64B] | ~ 1403 |
| DESTINATION ZIP CODE 1 | CHAR [8B] | ~ 1404 |
| DESTINATION ZIP CODE 2 | CHAR [8B] | ~ 1405 |
| DESTINATION PREFECTURE CODE | INTEGER | ~ 1406 |
| DELIVERY ADDRESS 1 | CHAR [256B] | ~ 1407 |
| DELIVERY ADDRESS 2 | CHAR [256B] | ~ 1408 |
| DESTINATION PHONE NUMBER 1 | CHAR [8B] | ~ 1409 |
| DESTINATION PHONE NUMBER 2 | CHAR [8B] | ~ 1410 |
| DESTINATION PHONE NUMBER 3 | CHAR [8B] | ~ 1411 |
| PRINT SITE ID | INTEGER | ~ 1412 |
| ORDER DATE | INTEGER | ~ 1413 |
| ORDER STATUS | INTEGER | ~ 1414 |

FIG. 15

ORDERER DATA TABLE /1500

| FIELD | TYPE | |
|---|---|---|
| ORDERER ID | INTEGER | ~1501 |
| USER ID | INTEGER | ~1502 |
| DESTINATION E-MAIL ADDRESS | CHAR [64B] | ~1503 |
| FAMILY NAME | CHAR [64B] | ~1504 |
| GIVEN NAME | CHAR [64B] | ~1505 |
| PHONETIC TRANSCRIPTION ( FAMILY NAME ) | CHAR [64B] | ~1506 |
| PHONETIC TRANSCRIPTION ( GIVEN NAME ) | CHAR [64B] | ~1507 |
| ZIP CODE 1 | CHAR [8B] | ~1508 |
| ZIP CODE 2 | CHAR [8B] | ~1509 |
| PREFECTURE CODE | INTEGER | ~1510 |
| ADDRESS 1 | CHAR [256B] | ~1511 |
| ADDRESS 2 | CHAR [256B] | ~1512 |
| PHONE NUMBER 1 | CHAR [8B] | ~1513 |
| PHONE NUMBER 2 | CHAR [8B] | ~1514 |
| PHONE NUMBER 3 | CHAR [8B] | ~1515 |

FIG. 16

ORDER SETTLEMENT DATA TABLE — 1600

| FIELD | TYPE | |
|---|---|---|
| ORDER NUMBER | INTEGER | ~ 1601 |
| SETTLEMENT METHOD | INTEGER | ~ 1602 |
| TOTAL CHARGE | INTEGER | ~ 1603 |
| PRINT CHARGE | INTEGER | ~ 1604 |
| TAX ON PRINT CHARGE | INTEGER | ~ 1605 |
| POSTAGE | INTEGER | ~ 1606 |
| TAX ON POSTAGE | INTEGER | ~ 1607 |
| SETTLEMENT STATUS | INTEGER | ~ 1608 |

SERVER APPARATUS, COMMUNICATIONS METHOD, PROGRAM FOR MAKING COMPUTER EXECUTE THE COMMUNICATIONS METHOD, AND COMPUTER-READABLE STORAGE MEDIUM CONTAINING THE PROGRAM

FIELD OF THE INVENTION

The present invention relates to a server apparatus and communications method for returning responses to requests from user terminals to provide services in response to orders from user terminals via a network as well as to a program for making a computer execute the communications method and computer-readable storage medium containing the program.

BACKGROUND OF THE INVENTION

Generally, a user terminal can acquire content by accessing a Web application server on a network such as the Internet. The Web application server performs a sequence of operations: accepts a request from the user terminal, carries out some processes in response to the request, and returns processing results to the user terminal as a response to the request. Upon receiving the response to the request, the user terminal outputs it to a display or the like.

However, if it takes time for the Web application server to perform the processes, the Web application server cannot return a response to the user terminal right away. Communications between a user terminal and server apparatus are cut off if no response is received within a limited time between transmission of a request and a communications timeout. In the case of cell phone communications and the like via a wireless communications network, timeout intervals are very short. Also, it takes a great deal of time for a server apparatus to process large volumes of image data or high-resolution image data. Thus, if a user terminal (cell phone) requests the server apparatus to process image data, communications will be cut off frequently, lowering operability for the user greatly.

SUMMARY OF THE INVENTION

In view of the above problem, an object of the present invention is to prevent communications from being cut off due to communications timeouts, by returning a response including an address needed to acquire processing results before a server apparatus finishes processing and returns the processing results in response to a request from a user terminal.

Another object of the present invention is to prevent communications timeouts and further improve operability for the user by changing a method for responding to a client according to the time required for processing performed by the server apparatus.

Still another object of the present invention is to prevent communications timeouts and improve operability for the user by changing a method for responding to a client according to the volume of data processed by the server apparatus.

other feature and advantageous of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is an example of an orderer information input screen brought up on the display of the portable terminal;

FIG. 7 is an example of a delivery destination information input screen brought up on the display of the portable terminal;

FIG. 8 is an example of a quotation display screen brought up on the display of the portable terminal;

FIG. 9 is an example of an order acceptance screen brought up on the display of the portable terminal;

FIG. 10 is an example of an order status notification screen brought up on the display of the portable terminal;

FIG. 11 is a sample text of e-mail sent to the portable terminal;

FIG. 12 is a flowchart showing exemplary procedures for accepting a print order at a photo site;

FIG. 14 is an example of fields in an order information data table;

FIG. 15 is an example of fields in an orderer data table;

FIG. 16 is an example of fields in a order settlement data table; and

DETAILED DESCRIPTION OF THE PREFERRED EMBODIMENTS

First Embodiment

A preferred embodiment of the present invention will be described in detail below in an exemplary manner with reference to drawings. However, the relative arrangement of components, display screens, etc. described in this embodiment are not intended to limit the scope of the present invention unless otherwise stated, and their variations and modifications should be construed as being included therein.

An information providing system which shares and provides image data via the Internet will be described here as an example of an information processing system according to an embodiment of the present invention.

(Outline of Information Providing System)

Figure 1:
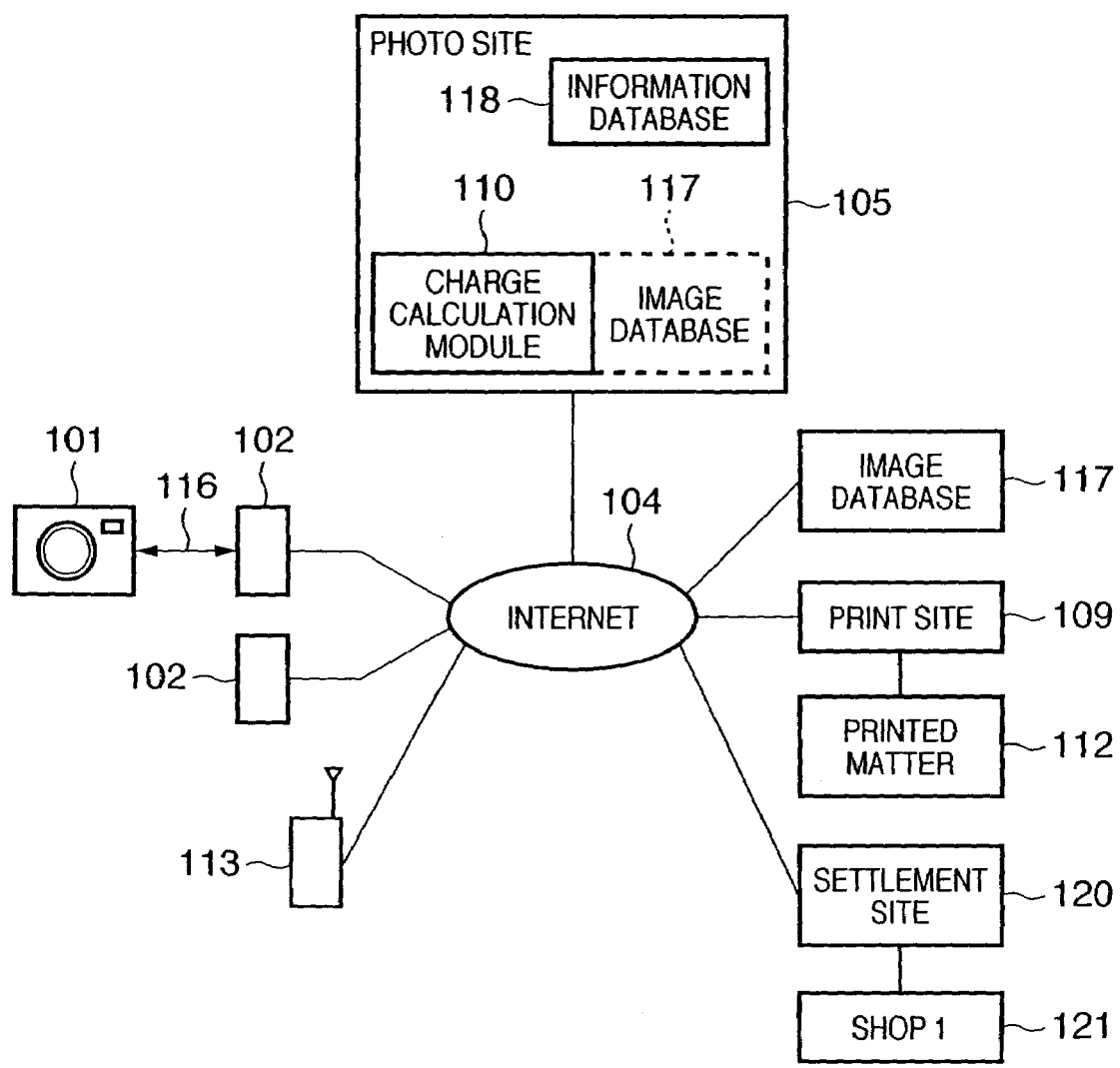
FIG. 1 is a diagram showing a configuration example of an information providing system.

FIG. 1 is a diagram showing a configuration example of the information providing system according to this embodiment.

The information providing system includes a photo site 105 which provides services of managing images, personal information, etc. received from the user; a print site 109 which prints the images managed by the photo site 105; a shop 121 which receives money for printed matter directly from the user; a settlement site 120 which settles accounts; a personal computer (PC) 102 (hereinafter referred to as the user's PC) of the user who receives the services; and a portable terminal 113. Reference numeral 101 denotes a digital camera which converts optical images constituting image information into electrical signals, performs predetermined image processing, and records and plays back resulting digital information. However, 101 is not limited to a digital camera, and it may be a scanner or other image input device. A data transfer interface 116 is used to transfer image data from the digital camera 101 to the user's PC 102. The data transfer interface 116 may be a cable interface as exemplified by Universal Serial Bus (USB) and IEEE1394 interfaces or a wireless interface as exemplified by IrDA and Bluetooth interfaces.

The photo site 105 stores image data picked up by the digital camera 101 of the user in an image database 117 set up in a server on the Internet 104 or in a storage area connected to the server and provides services including a service of allowing the user to view the stored image data, service of accepting print orders for the stored image data, and service of allowing guest users to view the stored image data.

Incidentally, the photo site 105 according to this embodiment does not provide print services by itself, and cooperates with the print site 109 which provides various print services.

Also, the photo site 105 according to this embodiment does not provide a settlement service by itself, and cooperates with the settlement site 120 which collects bills. It commissions a charge calculation module 110 to calculate the costs for print orders from the user and commissions the settlement site 120 to collect charges or pay advances. Then, when information about payment for the printed matter is received from the settlement site 120, the photo site 105 asks the print site 109 to produce prints from image data.

Also, the print site 109 prints out New Year's cards, word processor documents, images, and other electronic documents transferred via the Internet 104 on a printing device and provides the printed matter 112 as commodities.

The user's PC 102 is equipped with a Web browser compatible with standard protocols which allow information to be transferred over the Internet 104. The Web browser can access the photo site 105 using the HTTP or other standard protocol and display Web information written in HTML, XML, or other description language. The Web information is linked to multimedia information such as images and voice managed by the photo site 105. Through the Web browser, the user of the user's PC 102 can receive services provided by the photo site 105 over the Internet 104.

(Exemplary Hardware Configuration of Servers Composing Photo Site)

Figure 2:
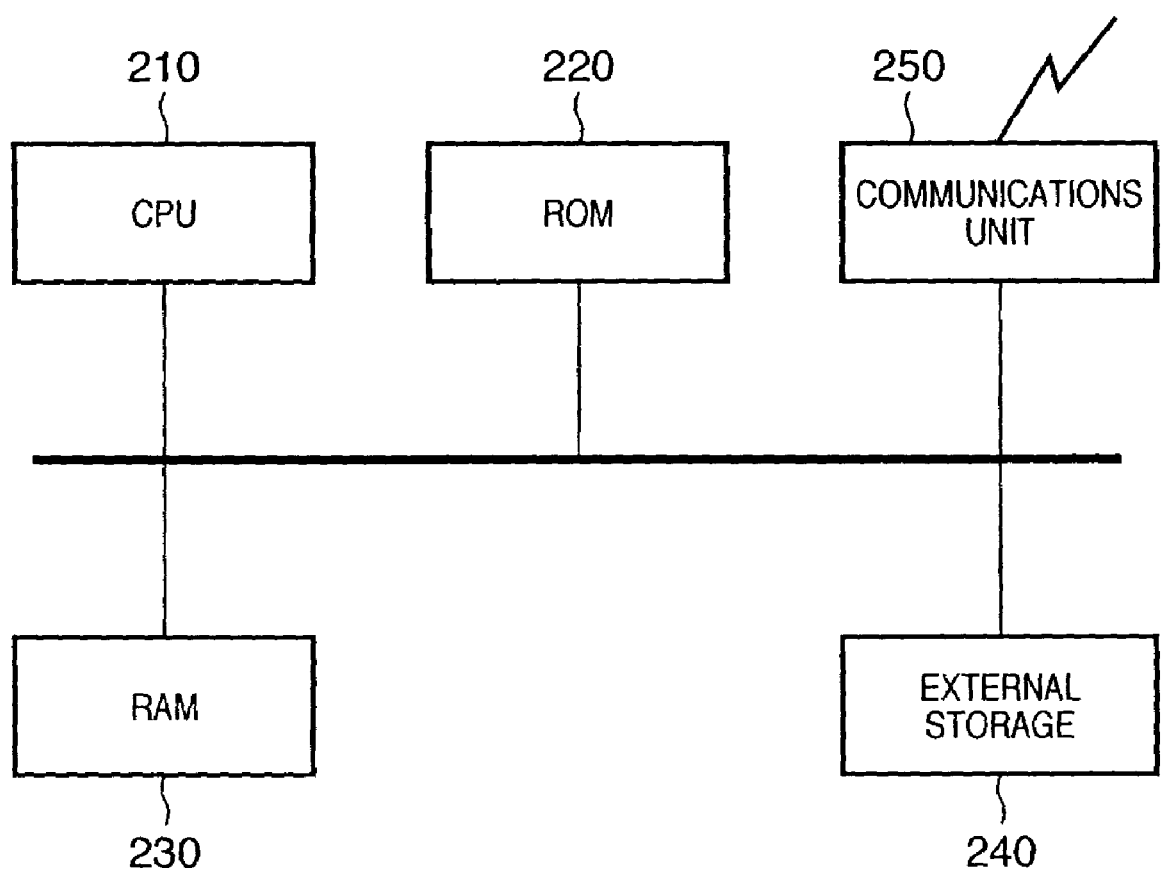
FIG. 2 is an exemplary hardware configuration of servers composing a photo site.

FIG. 2 is a diagram showing an exemplary hardware configuration of servers composing the photo site 105 according to this embodiment. Incidentally, the configuration in FIG. 2 is centered around a controller, and input/output devices and the like are omitted. Also, the photo site 105 is composed of multiple servers which are connected to a local area network (LAN) and perform various functions.

Reference numeral 210 denotes a central processing unit (CPU) which is a controller for controlling the entire server. A read only memory (ROM) 220 prestores programs and parameters which do not need alteration. Random access memory (RAM) 230 is a storage area which temporarily stores programs and data.

External storage 240 consists of a data storage area and program storage area and includes a fixed hard disk and memory card as well as a removable portable floppy disk (FD), optical disk such as a compact disk (CD), magnetic or optical card, IC card, memory card, etc.

Incidentally, the ROM 220 and RAM 230, and especially the external storage 240 may be distributed over a plurality of devices. Also, they may be provided outside the server apparatus and connected with it in such a way that they can communicate with it.

(Image Storage Service)

Desired image data is selected from image data stored in an information storage area of the user's PC 102 based on information displayed in the Web browser and transferred to the image DB 117 managed by the photo site 105 via the Internet 104 when an image update request is submitted. Alternatively, it may be transferred according to an image upload program installed on the user's PC 102 instead of the information displayed in the Web browser. In either case, it is transferred according to a protocol such as http or ftp used on the Internet 104.

The photo site 105 stores the image data uploaded from the user's PC 102 in the image DB 117.

Incidentally, the photo site 105 may manage the image data uploaded from the user's PC 102 by grouping them into albums.

Also, the photo site 105 not only manages image data, but also manages attribute information about the image data as well as various data centrally. The various data include, for example, user attribute information used for authentication of the users accessing the photo site 105 and attribute information about the print site 109 which is commissioned to produce prints based on stored image data.

Also, although a PC is cited as an example of the terminal which uploads image data, this is not restrictive, and image data may be uploaded from the portable terminal 113 such as a cell phone or image input device such as a digital camera, digital video recorder, scanner, or copier.

(Image Viewing Service)

The user accesses the photo site 105 using the Web browser running on the user's PC 102 and requests permission to view image data stored at the photo site 105. Then, after performing user authentication and the like, the photo site 105 sends out Web page information to the Internet 104 in order to display images in the Web browser on the user's PC 102. The Web browser on the user's PC 102 analyzes the Web page information sent out from the photo site 105 and displays images.

In order to allow guest users specified by the user to view images or albums stored in the image DB 117 of the photo site 105, the user should inform the photo site 105 of e-mail addresses of the guest users by entering them in an input screen supplied from the photo site 105 and displayed in the Web browser on the user's PC 102.

The photo site 105 generates a universal resource locator (URL) for accessing the images or albums to be viewed by the guest users. Then, it sends an e-mail message containing the generated URL to the guest users.

The guest users who have received the e-mail from the photo site 105 can access the photo site 105 by entering the URL contained in the e-mail, in the Web browser on the user's PC 102 and display images or albums.

Although the user and guest users view images using their PC in the example described above, it is obvious that the portable terminal 113 can also be used.

(Print Order Acceptance Service)

The user can view image data in albums stored in the image DB 117 of the photo site 105 by operating the user's PC 102 or portable terminal 113 and entering the URL issued by the photo site 105 in the Web browser.

Figure 3:
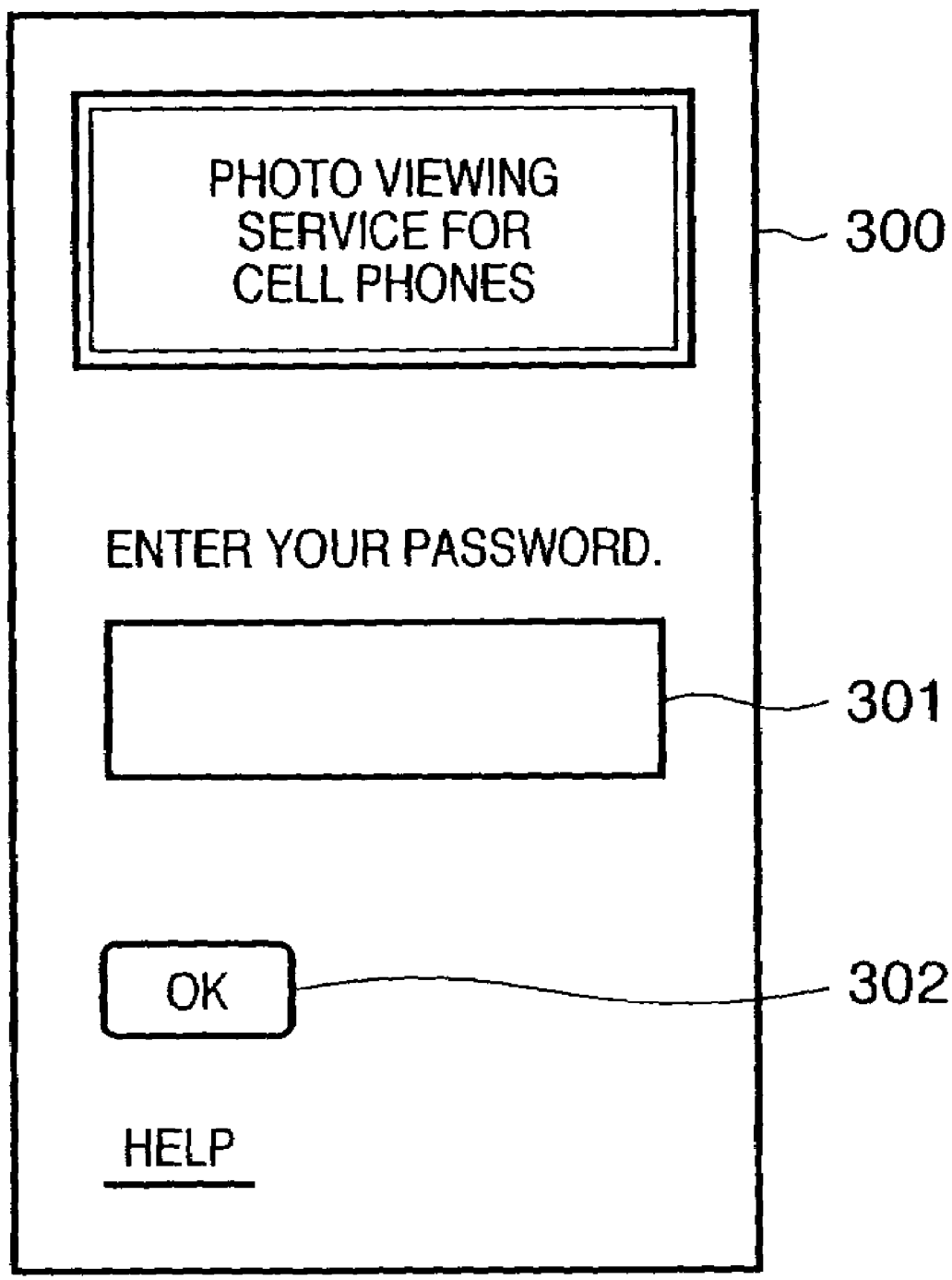
FIG. 3 is an example of a login screen brought up on the display of the portable terminal.

FIG. 3 shows a login screen brought up on the display of the portable terminal 113 in order for the user to view albums. The user can view images in an album by entering an appropriate password in a password input field 301 and pressing an OK button 302 on the portable terminal 113.

When newly accessed by the portable terminal 113, the photo site 105 issues a session ID to uniquely identify this access. The portable terminal 113 is informed of the session ID and accesses the photo site 105 using the URL with the session ID contained in its parameter section. The use of the session ID for communications with the portable terminal 113 allows the photo site 105 to recognize continuous access from the portable terminal 113 and manage the portable terminal 113.

The user can order prints of images in the displayed album from the photo site 105.

(Ordering Prints Using Portable Terminal)

Figure 4:
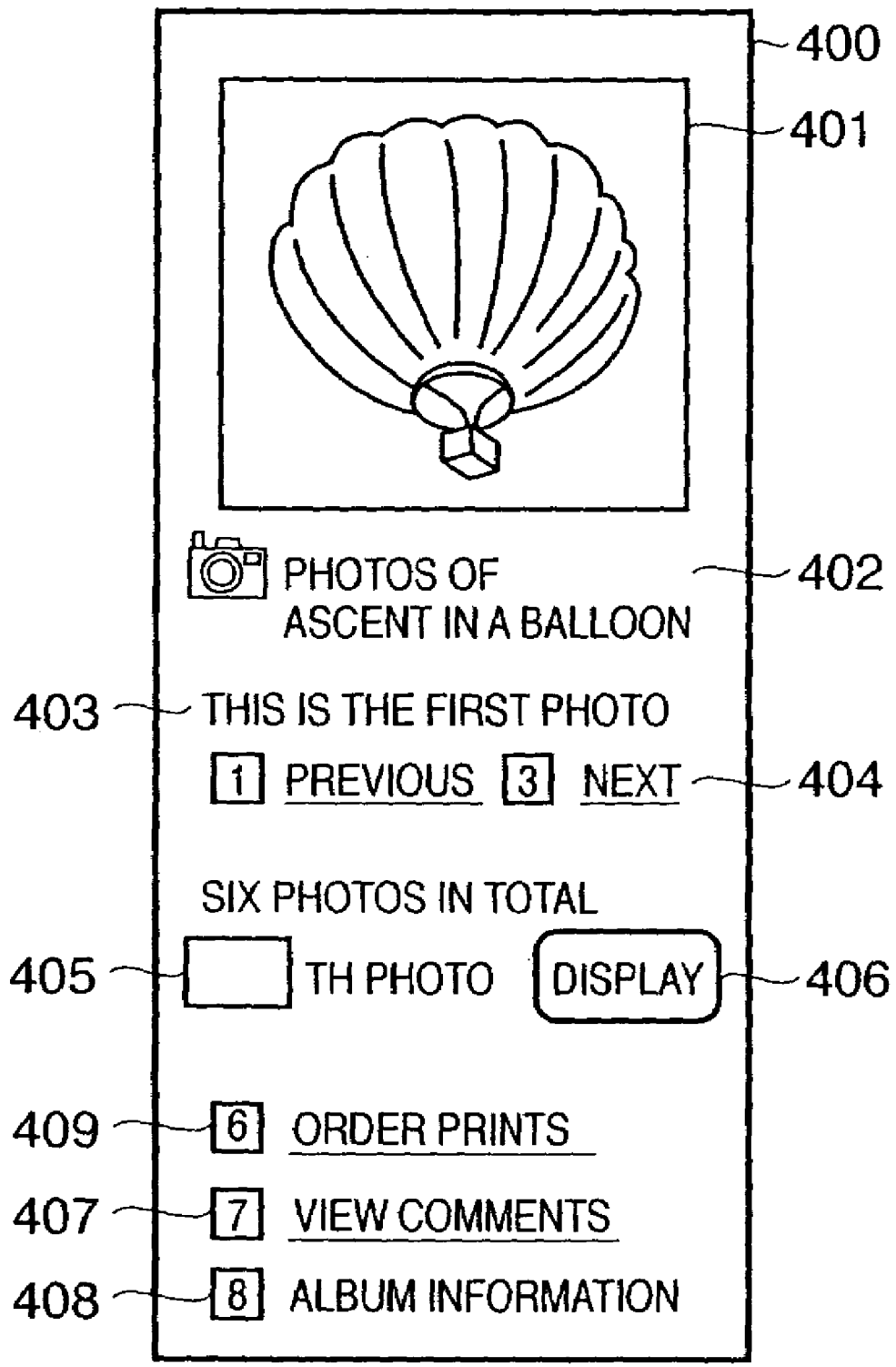
FIG. 4 is an example of an image viewing screen brought up on the display of the portable terminal.

When the user orders prints of images contained in the album he/she is viewing on the display of the portable terminal 113, the user sends out a print order request to the photo site 105 via the Internet 104 by pressing an Order Prints link 409 in an image viewing screen 400 in FIG. 4. Upon receiving the print order request from the portable terminal 113, an application server 204 at the photo site 105 performs print order processing.

The print order processing performed by the servers composing the photo site 105 will be described in detail below with reference to a flowchart in FIG. 12.

Step S1201:

The photo site 105 issues a new order number for the received print order request. The order number issued here is always contained in the parameter section of the URL embedded in various print order processing screens brought up subsequently on the display of the portable terminal 113 and is exchanged in communications with the photo site 105. Then, the photo site 105 creates a record for the new order in an order information data table 1400 in a database 118, stores the issued order number in it, and sets order status 1414 to "0" (Print Job Yet To Be Ordered). An example of fields in the order information data table 1400 is shown in FIG. 14.

FIG. 14 shows the order information data table managed by the photo site 105. One record is created for each album print order in the order information data table 1400 and registered and managed in the database 118. Using the order number 1401 issued for each print order as a key, the order information data table 1400 stores the following data: Orderer ID 1402; Recipient Name 1403; Destination Zip Code (1, 2) 1404 and 1405; Destination Prefecture Code 1406; Delivery Address 1407 (1, 2) and 1408; Destination Phone Number (1, 2, 3) 1409, 1410, and 1411; and Order Date 1413.

Figure 5:
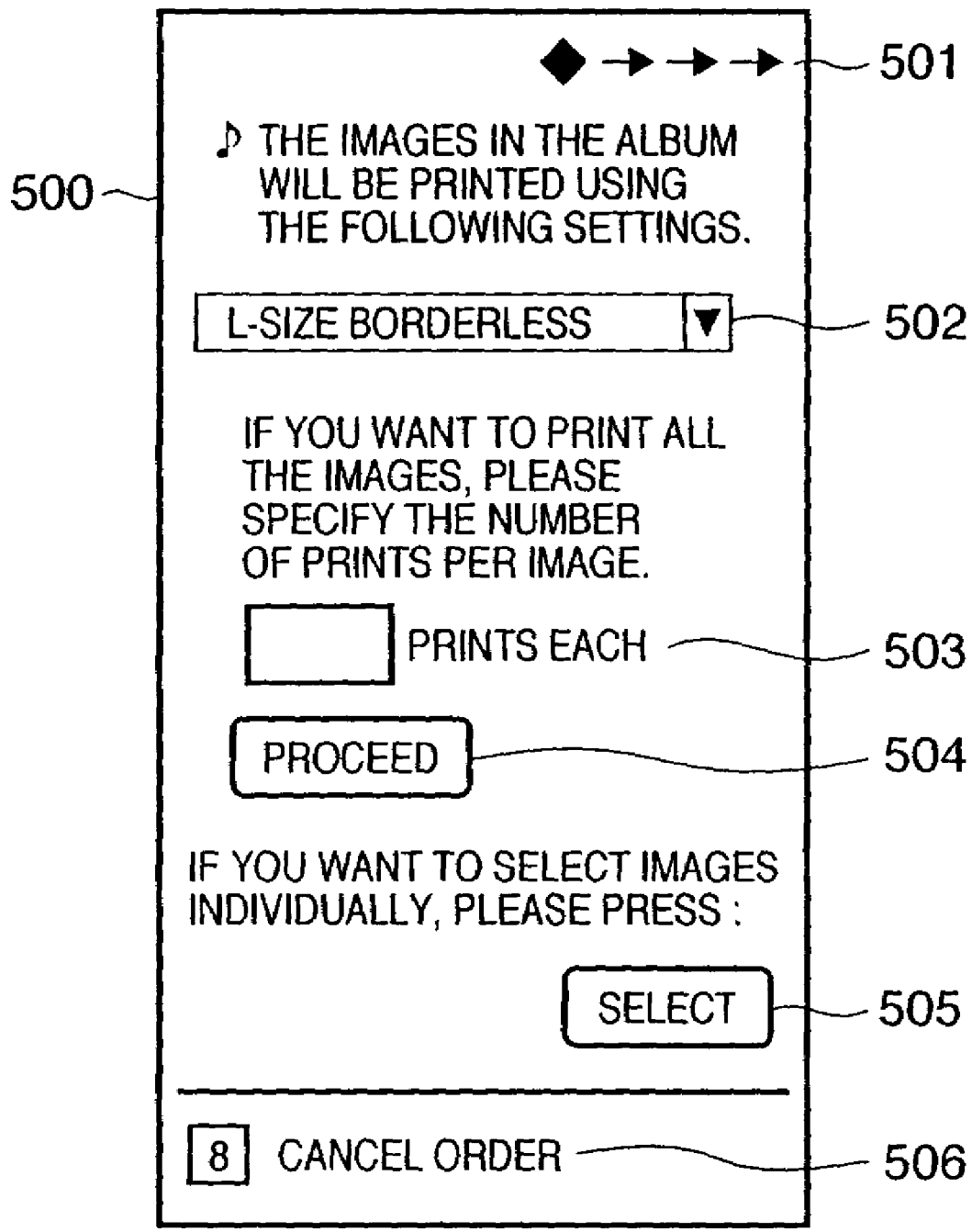
FIG. 5 is an example of a batch print order screen brought up on the display of the portable terminal.

Step S1202:

The photo site 105 sends out Web page data via the Internet 104 to display a batch print order screen 500 such as the one shown in FIG. 5 in a Web browser on the portable terminal 113. The Web browser on the portable terminal 113 analyzes the received Web page data and displays the batch print order screen 500 on the display. The batch print order screen 500 displays a print size selection field 502 and number-of-prints input field 503 for all the images in the album the user is viewing on the display of the portable terminal 113, prompting the user to enter data. The user can list available print sizes by pulling down the print size selection field 502 and select a desired one from them. According to this embodiment, six print sizes are available: Standard Size Borderless, Standard Size Bordered, L-Size Borderless, L-Size Bordered, 2L-Size Borderless, and 2L-Size Bordered. Then, the user enters the desired number of prints in the number-of-prints input field 503. If the user wants to order prints using the print size and the number of prints specified, he/she should press a PROCEED button 504.

An indicator 501 is displayed at the top of the batch print order screen 500 to indicate the current phase of print order processing. According to this embodiment, there are four phases: screen selection, personal information input, quotation, and order confirmation. The indicator employs a ◆ mark to schematically indicate what phase the current screen is in. On the batch print order screen 500, the ◆ mark is located at the leftmost position. Then, each time the phase advances, the ◆ mark moves one position rightward. This abstract method is used because the portable terminal 113, which has a limited display area, cannot indicate screen names in words. The indicator allows the user to keep track of the progress of the print order processing. Incidentally, the number of phases is not limited to four and the display format is not limited to the one described above.

Step S1203:

When the user presses the PROCEED button 504, the photo site 105 checks the entered order information for inadequacies such as unfilled fields or invalid characters. If there is no inadequacy, the photo site 105 sends out Web page data via the Internet 104 to display an orderer information input screen 600 such as the one shown in FIG. 6 in the Web browser on the portable terminal 113. The Web browser on the portable terminal 113 analyzes the received Web page data and displays the orderer information input screen 600 on the display. The orderer information input screen 600 displays the following input fields, prompting the user to enter information: Family Name and Given Name of the user 602 and 603, Phonetic Transcription of Family Name and Given Name 604 and 605, Zip Code 606, Address 607 to 609, Phone Number 610, E-mail Address 611, Delivery Method 612, and Delivery Destination 613. The user enters user information according to instructions on the orderer information input screen 600 and presses a PROCEED button 614. If there are inadequacies, the photo site 105 sends out Web page data via the Internet 104 to display an error screen in the Web browser on the portable terminal 113 and prompts the user to enter data again.

Incidentally, the orderer information input screen 600 belongs to the personal information input phase and an indicator 601 at the top of the screen shows the ◆ mark at the second position from the left.

Step S1204:

When the user presses the PROCEED button 614, the photo site 105 checks the entered information for inadequacies. If there is no inadequacy, the photo site 105 issues an orderer ID, creates a new record in an orderer data table 1500 (FIG. 15), and stores the orderer ID together with the entered user information. If there are inadequacies, the photo site 105 sends out Web page data to display an error screen in the Web browser on the portable terminal 113 and prompts the user to enter data again.

FIG. 15 is a diagram showing the orderer data table managed by the photo site 105. One record is created for each album print order in the orderer data table 1500 and registered and managed in the database 118. Using the orderer ID 1501 as a key, the orderer data table 1500 manages the following data: User ID 1502; Destination E-mail Address 1503; Family Name 1504; Given Name 1505; Phonetic Transcription (Family Name) 1506; Phonetic Transcription (Given Name) 1507; Zip Code (1, 2) 1508 and 1509; Prefecture Code 1510; Address 1511 (1, 2) and 1512; and Phone Number (1, 2, 3) 1513, 1514, and 1515. Incidentally, the same ID is stored in the Orderer ID field 1402 and Orderer ID field 1501 for the same order.

Incidentally, if a Return link 616 is pressed at this point, the Web browser on the portable terminal 113 returns to the previous screen, the batch print order screen 500.

Step S1205:

The photo site 105 checks whether the user selected "Same as orderer" for the delivery destination 613 and pressed the PROCEED button 614.

Step S1206:

If it is found that the user selected "Specify destination" instead of "Same as orderer" before pressing the PROCEED button 614, the photo site 105 sends out Web page data to display a delivery destination input screen 700 such as the one shown in FIG. 7 in the Web browser on the portable terminal 113. The Web browser on the portable terminal 113 analyzes the received Web page data and displays the delivery destination input screen 700 on the display. The delivery destination input screen 700 displays input following fields, prompting the user to enter delivery destination information: Recipient Name 702 and 703, Phonetic Transcription of name 704 and 705, Zip Code 706, Address 707 to 709, Phone Number 710, and E-mail Address 711. The user enters information according to instructions on the delivery destination input screen 700 and presses a PROCEED button 712.

Incidentally, the delivery destination input screen 700 belongs to the personal information input phase as is the case with the orderer information input screen 600, and the indicator 701 at the top of the screen shows the ♦ mark at the second position from the left as in the case of the orderer information input screen 600.

Step S1207:

When the user presses the PROCEED button 712, the photo site 105 checks the entered information for inadequacies. If there is no inadequacy, the photo site 105 stores delivery destination information in the record in the order information data table 1400 created in Step S1204.

If "Same as orderer" is selected in Step S1205, the photo site 105 stores the delivery destination information by copying it from the orderer information.

Incidentally, if there are inadequacies, the photo site 105 sends out Web page data to display an error screen in the Web browser on the portable terminal 113 and prompts the user to enter data again.

If a Return link 714 is pressed, the photo site 105 brings up the orderer information input screen 600 again on the display of the portable terminal 113.

Step S1208:

The photo site 105 prepares quotation data by calculating commodity prices, postage, various handling fees, and the total charge based on the order information, user information, and delivery destination information received from the portable terminal 113 in Steps S1202, S1203, and S1206. Then, the photo site 105 sends out Web page data to the portable terminal 113 via the Internet 104 to display the calculated values on a quotation display screen 800 such as the one shown in FIG. 8. The quotation display screen 800 displays the entered user information and delivery destination information together with the calculated values to allow the user to verify them. According to this embodiment, since it is assumed that the delivery destination information is the same as the orderer information, the Delivery Destination field on the quotation display screen 800 contains "Same as orderer." If the delivery destination information differs from the orderer information, the Delivery Destination field displays a concrete delivery destination.

Incidentally, the quotation display screen 800 belongs to the quotation phase, and the indicator 801 at the top of the screen shows the ♦ mark at the third position from the left.

Step S1209:

The photo site 105 creates a new record in an order settlement data table 1600 (FIG. 16), and stores the quotation data prepared in Step S1208. At this time, settlement status 1608 is set to "0" (Order Yet To Be Confirmed).

One record is created for each album print order in the order settlement data table 1600 and registered and managed in the database 118. Using an order number 1601 as a key, the order settlement data table 1600 manages the following data: Settlement Method 1602, Total Charge 1603, Print Charge 1604, Tax On Print Charge 1605, Postage 1606, Tax On Postage 1607, and Settlement Status 1608. There are four valid values for the settlement method 1602: "1" represents money transfer, "2" represents cash on delivery, "3" represents credit card settlement, and "4" represents account settlement with a shop. In this embodiment, only a flow for account settlement with a shop ("4") will be described. Regarding the settlement status 1608, "0" represents Order Yet To Be Confirmed (default), "1" represents Payment Outstanding, and "2" represents Account Settled. Incidentally, the same order number is stored in the Order Number field 1601 and Order Number field 1401 for the same order.

Step S1210:

When the user presses an ORDER button 802, the photo site 105 checks whether the ordered image album exists in an image information data table 900. If the user presses a Return link 804, the photo site 105 brings up the previous screen—the orderer information input screen 600 or delivery destination input screen 700—on the display of the portable terminal 113.

If the user presses a Cancel Order link 803, the photo site 105 cancels the print order processing and brings up the image viewing screen 400 on the display of the portable terminal 113. The image displayed at this time is the one displayed just before the start of the print order processing.

If the images do not exist in the image information data table 900, the photo site 105 sends out Web page data to display an error screen on the display of the portable terminal 113. Then, it brings up the batch print order screen 500 on the display of the portable terminal 113, prompting the user to select images again.

Step S1211:

If it is found in Step S1210 that the images exist, the photo site 105 checks whether the print order request has already been accepted. Specifically, based on the order number contained in the print order request (URL parameter) received from the portable terminal 113 when the ORDER button 802 on the quotation display screen 800 is pressed, the photo site 105 searches the order settlement data table 1600 for the appropriate record and references the settlement status 1608 in the record. The photo site 105 checks whether the settlement status 1608 is "0" (Order Yet To Be Confirmed). The process in Step S1211 is needed to use the same URL for both an order acceptance screen 900 shown in FIG. 9 and an order status screen 1000 in order to improve operability for the user. Incidentally, if the settlement status 1608 is other than "0,", the photo site 105 sends out Web page data of the order status screen 1000 in Step S1217 described later.

Step S1212:

If it is found in Step S1211 that the settlement status 1608 is "0" (Order Yet To Be Confirmed), the photo site 105 checks whether a print order creation process in Step S1213 (described later) is going on. The process in Step S1212 is needed to avoid redundant order requests in case the ORDER button 802 on the quotation display screen 800 is pressed twice by mistake.

If it is found that the print order creation process is going on, the photo site 105 determines that the print order request is redundant, sends out Web page data to display an error screen on the display of the portable terminal 113, and terminates the print order processing.

Step S1213:

The photo site 105 sends out Web page data via the Internet 104 to display the order acceptance screen 900 such as the one shown in FIG. 9 in the Web browser on the portable terminal 113. The order acceptance screen 900 informs the user that the print order request has been accepted, that order acceptance process is complete, and that an e-mail notice about acceptance of the order will be sent to the user.

Furthermore, according to this embodiment, the order acceptance screen 900 informs the user that the URL on the order acceptance screen 900 can be recorded as a bookmark in memory in the portable terminal 113 to subsequently allow the user to display the order status screen 1000 (described later) by accessing the URL.

If the user presses a FINISH button 902 on the order acceptance screen 900, the photo site 105 completes the print order processing and brings up the image viewing screen 400 on the display of the portable terminal 113. The image displayed at this time is the one displayed just before the start of the print order processing.

Incidentally, the order acceptance screen 900 belongs to the order confirmation phase, and the indicator 901 at the top of the screen shows the ♦ mark at the rightmost position.

Step S1214:

The photo site 105 creates a print order file. The print order file is created by gathering together the image data specified, order information which contains the print size and number of prints, orderer information, delivery destination information, quotation data, etc.

It takes a considerable amount of time to create the print order file in Step S1214 if a large number of images are ordered or a large volume of image data is handled.

Step S1215:

The photo site 105 sends the quotation data to the settlement site 120. The settlement site 120 starts a billing process based on the quotation data. Also, it issues a bill number for billing and notifies the photo site 105 of it.

Upon receiving the bill number from the settlement site 120, the photo site 105 changes the status 1608 in the appropriate record in the order settlement data table 1600 to "1" (Payment Outstanding). Then, the photo site 105 sends the user's portable terminal 113 e-mail containing the bill number as shown in FIG. 11.

After receiving the bill number, they user pays the charge at the shop 121 by presenting the bill number. Upon receiving the payment from the user, the shop 121 gives a credit advice to the settlement site 120. The settlement site 120 registers the receipt of the payment and gives an account-settled notice to the photo site 105.

Upon receiving the account-settled notice from the settlement site 120, the photo site 105 changes the status 1608 in the appropriate record in the order settlement data table 1600 to "2" (Account Settled).

Incidentally, the processes in Steps S1214 and S1215 are performed concurrently.

Step S1216:

The photo site 105 sends the print order file created in Step S1214 to the print site 109 and issues a print job order. Then, it changes the status 1414 in the appropriate record in the order information data table 1400 to "0" (Print Job Ordered).

Upon receiving the print job order from the photo site 105, the print site 109 produces prints from the image data specified by the user, according to the print order file. When it is done with printing, the print site 109 displays a delivery order on a monitor or the like so that the operator can see it. Also, it sends a printing-complete notice to the photo site 105 and finishes printing.

Upon receiving the printing-complete notice from the print site 109, the photo site 105 changes the status 1414 in the appropriate record in the order information data table 1400 to "2" (Goods Delivered). Then, the photo site 105 sends e-mail to the portable terminal 113, informing the latter about the shipment of the printed matter.

Step S1217:

When the portable terminal 113 accesses the URL bookmarked in Step S1213, the photo site 105 sends out Web page data via the Internet 104 to display the order status screen 1000 such as the one shown in FIG. 10 in the Web browser on the portable terminal 113.

The order status screen 1000 is provided so that the user who has placed a print order with the photo site 105 by operating the portable terminal 113 can check the status of print processing subsequently. The order status screen 1000 displays the following information: User Name 1001, Time Of Acceptance 1002, Print Size 1003, Order Amount 1004, To Be Paid At 1005, Bill Number 1006, Due Date 1007, Process Status 1008, Commodity Information 1009, etc. The photo site 105 sets the Process Status 1008 to "Payment Pending," "Payment Due Date Expired," "Queued For Printing," "Printing Complete," "Delivery Complete," or the like by using the order number contained in the parameter section of the URL and by referring to the order status 1414 in the order information data table 1400 or the settlement status 1608 in the order settlement data table 1600.

Incidentally, the portable terminal 113 can access the photo site 105 and acquire the Web page data for the order status screen 1000 also by using the URL contained in the e-mail sent in Step S1215 instead of the bookmarked URL.

As described above, according to this embodiment, upon receiving a print order from the portable terminal 113, the photo site 105 sends out the Web page data for the order acceptance screen 900 in Step S1213. Subsequently, order status is notified to the user in a communications session separate from that for the print order placement by using e-mail or accessing a bookmarked URL, for example. This makes it possible to avoid a situation in which if the user were notified of a bill number in the same communications session as the print order placement, it would take time to create a print order file and communicate with the settlement site 120, and consequently, communications with the portable terminal 113 would be terminated due to a timeout, leaving print order processing unfinished.

Incidentally, although the photo site 105 sends out the Web page data for the order acceptance screen 900 in Step S1213 as described above when it receives a print order from the portable terminal 113, it does not send out the Web page data for the order acceptance screen 900 if it receives a print order from the user's PC 102. Also, in the case of the user's PC 102, the bill number is notified to the user in the Web browser rather than via e-mail, in the same communications session as that for print order placement. This is because compared to communications with the portable terminal 113, communications with the PC 102, which allow for a longer timeout interval, are less liable to be terminated even if it takes time to create an order file because of a large number of specified images or a large volume of data or if it takes time to communicate with the settlement site 120 because of poor network conditions.

Incidentally, although this embodiment has cited an example in which the bill number is notified to the user by e-mail, it is obvious that another method such as telephone may be used.

Also, although this embodiment has cited an example in which a print order for image data is processed, it is obvious the present invention can similarly be applied to other processes.

Second Embodiment

In this embodiment, the photo site 105 changes the method for order status notification according to the time required to create an order file.

Only the part different from the first embodiment will be described below, and description of the same part as the first embodiment will be omitted.

Figure 13:
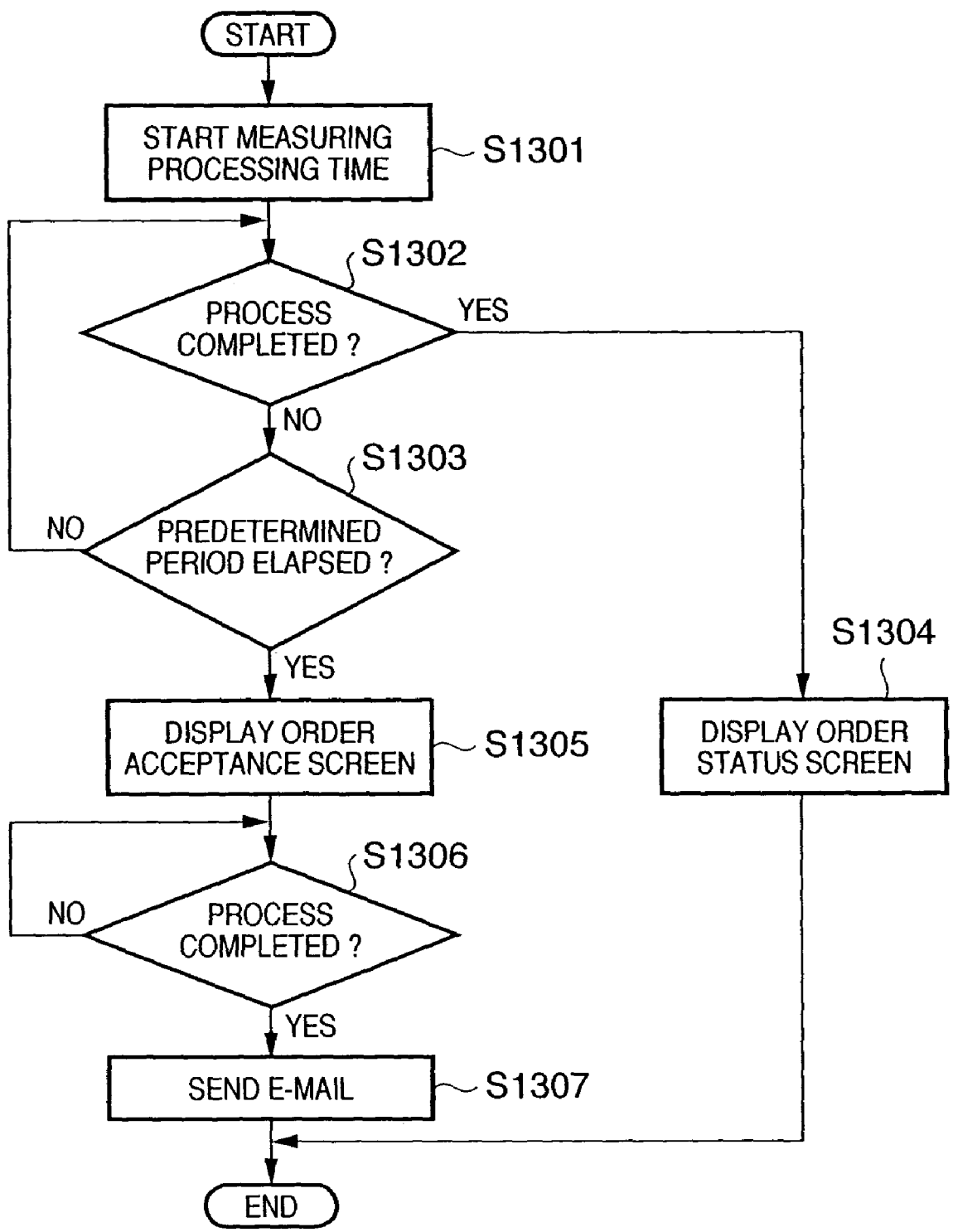
FIG. 13 is a flowchart showing exemplary procedures for accepting a print order at the photo site.

If it is found in Step S1212 of the first embodiment that the print order request is not redundant, the photo site 105 according to this embodiment creates an order file in Step S1214 and settles an account in Step S1215 instead of displaying the order acceptance screen in Step S1213. Concurrently with the order file creation and account settlement processes, the photo site 105 measures processing time as shown in a flowchart in FIG. 13.

Incidentally, the photo site 105 is composed of multiple servers, each of which performs the following processes.

Step S1301:
The photo site 105 starts measuring processing time.

Step S1302:
The photo site 105 checks whether the print order processing is complete.

Step S1303:
If it is found in Step S1302 that the print order processing is not complete, the photo site 105 judges whether a predetermined period of time has elapsed since the processing time was started to be measured.

If it is found that the predetermined period of time has not elapsed, the photo site 105 returns to Step S1302, where it judges whether a print order creation process is complete.

The predetermined period of time here means a timeout period preset in the photo site 105 and is long enough to return a response to a print order request from the portable terminal 113 before a communications timeout occurs. Incidentally, the system administrator of the photo site 105 can set the timeout period freely.

Step S1304:
If it is found in Step S1302 that the process is complete, the photo site 105 sends out Web page data to display the order status screen 1000 in the Web browser on the portable terminal 113. In this way, the photo site 105 can return the results of print order processing (the order status screen 1000) in response to a print order request from the portable terminal 113 before a communications timeout occurs.

Step S1305:
If it is found in Step S1303 that the predetermined period of time has elapsed, the photo site 105 sends out Web page data to display the order acceptance screen 900 in the Web browser on the portable terminal 113. In this way, the photo site 105 can return the progress of print order processing (the order status screen 900) in response to a print order request from the portable terminal 113 before a communications timeout occurs.

Step S1306:
The photo site 105 checks whether the print order creation and account settlement processes are complete.

Step S1307:
If it is found in Step S1306 that the print order creation process is complete, the photo site 105 sends e-mail such as the one shown in FIG. 11 to the portable terminal 113.

As described above, according to this embodiment, it is checked whether print order creation and account settlement processes are complete before a communications timeout occurs, and if they are complete, an order status notification which reflects their results is displayed in the Web browser on the user's portable terminal 113. If the print order creation or account settlement process is not complete before a communications timeout occurs, an order status notification is sent by e-mail after they are completed or a URL is sent to the user's portable terminal 113 to display the progress of the processes in the Web browser on the portable terminal 113.

Consequently, if processing is finished earlier, the user can be notified of order status immediately in the same communications session as the print order placement. On the other hand, if processing takes time, the order status is notified to the user in a communications session separate from that for the print order placement by using e-mail or accessing a bookmarked URL, for example. This makes it possible to avoid a situation in which communications with the portable terminal 113 would be terminated due to a timeout, leaving print order processing unfinished.

Third Embodiment

In this embodiment, the photo site 105 changes the method for presenting a bill number according to the number of images specified in a print order. Only the part different from the first embodiment will be described below, and description of the same part as the first embodiment will be omitted. Incidentally, the time required to create an order file increases with increases in the number of images.

Figure 17:
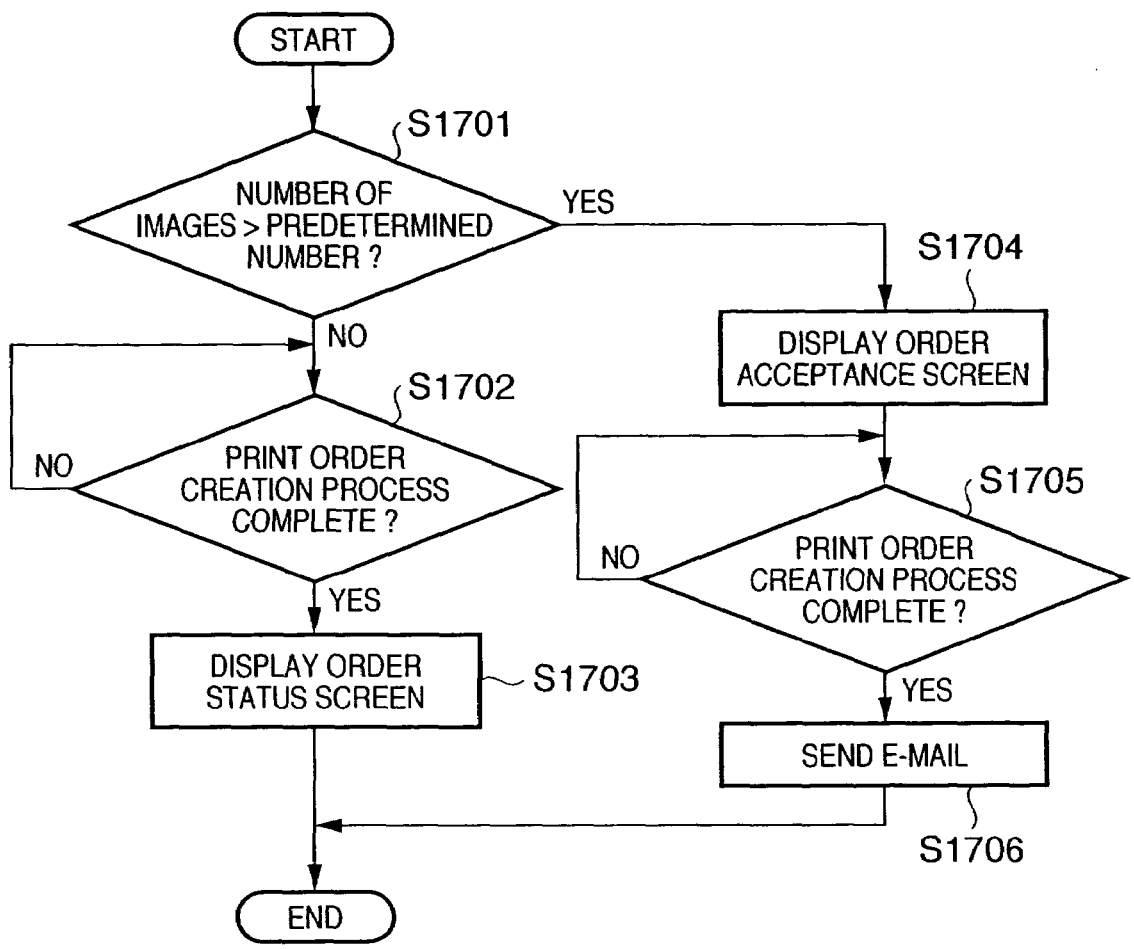
FIG. 17 is a flowchart showing exemplary procedures for accepting a print order at the photo site.

If it is found in Step S1212 of the first embodiment that the print order request is not redundant, the photo site 105 according to this embodiment creates an order file in Step S1214 and settles an account in Step S1215 instead of displaying the order acceptance screen in Step S1213. Concurrently with the order file creation and account settlement processes, the photo site 105 measures the number of specified images as shown in a flowchart in FIG. 17.

Incidentally, the photo site 105 is composed of multiple servers, each of which performs the following processes.

Step S1701:
The photo site 105 measures the number of images specified in the print order and judges whether the measured value exceeds a predetermined number.

Step S1702:
If it is found in Step S1701 that the number of images specified in the print order is within a predetermined number, the photo site 105 judges whether a print order creation process is complete.

Step S1703:
If it is found in Step S1702 that the print order creation process is complete, the photo site 105 sends out Web page data to display the order status screen 1000 in the Web browser on the portable terminal 113.

Step S1704:
If it is found in Step S1701 that the number of images specified in the print order exceeds the predetermined number, the photo site 105 sends out Web page data to display the order acceptance screen 900 in the Web browser on the portable terminal 113.

The judgment as to whether the print order creation process is complete is made based on whether the status 1608 in the appropriate record in the order settlement data table 1600 is "1" (Payment Outstanding).

Step S1705:
The photo site 105 checks whether the print order creation process is complete.

Step S1706:
If it is found in Step S1705 that the print order creation process is complete, the photo site 105 sends e-mail such as the one shown in FIG. 11 to the portable terminal 113.

The predetermined number here means a value preset in the photo site 105 and is small enough to return a response to a print order request from the portable terminal 113 before a communications timeout occurs. Incidentally, the system administrator of the photo site 105 can set this number freely.

As described above, in this embodiment, the photo site 105 changes the method for notifying the user about the completion of processing according to the number of images specified in a print order in view of the fact that the time required to create an order file increases with increases in the number of images to be printed.

Consequently, if processing is expected to be finished earlier, the user can be notified of order status immediately in the same communications session as the print order placement. On the other hand, if processing is expected to take time, the order status is notified to the user in a communications session separate from that for the print order placement by using e-mail or accessing a bookmarked URL, for example. This makes it possible to avoid a situation in which communications with the portable terminal 113 would be terminated due to a timeout, leaving print order processing unfinished.

Incidentally, FIGS. 5 to 11 show examples of screens brought up on the display of the portable terminal 113. The display layout varies with the condition of word-wrapping, size of images displayed, etc., which depend on screen size, which in turn varies with the portable terminal.

Also, although a network-based image distribution service for digital cameras has been cited in this embodiment, needless to say, the present invention can be applied to not only images distribution services, but also voice and other information distribution services. Furthermore, as described above, the present invention is not limited to image viewing systems, but can be widely applied to mobile phone services which connects to servers or other external devices via a communications line and such applications are included in the scope of the present invention.

Needless to say, the objects of the present invention can also be achieved by a storage medium (or recording medium) containing the software program code that implements the functions of the above embodiments: it is supplied to a system or apparatus, whose computer (or a CPU or MPU) then reads the program code out of the storage medium and executes it. In that case, the program code itself read out from the storage medium will implement the functions of the above embodiment, and the storage medium which stores the program code will constitute the present invention. The functions of the above embodiments may be implemented not only by the program code read out and executed by the computer, but also by part or all of the actual processing executed, in accordance with instructions from the program code, by an OS (operating system) running on the computer.

Furthermore, the functions of the above embodiments may also be implemented by part or all of the actual processing executed by a CPU or the like contained in a function expansion card inserted in the computer or a function expansion unit connected to the computer if the processing is performed in accordance with instructions from the program code that has been read out of the storage medium and written into memory on the function expansion card or unit.

In the case where the present invention is applied to the storage medium mentioned above, the storage medium will store program code including the program code that corresponds to the above-described flowcharts.

As many apparently widely different embodiments of the present invention can be made without departing from the spirit and scope thereof, it is to be understood that the invention is not limited to the specific embodiments thereof except as defined in the appended claims.

What is claimed is:

1. A server apparatus which manages image data and receives a print request from one of a plurality of communication terminals via a network, comprising:

generating means for generating a print order based on the print request received from the one of the plurality of communication terminals;

measuring means for measuring a performance time of the generating of the print order;

checking means for checking whether the generating of the print order is complete; and sending control means for controlling to send Web page information related to the print order to the one of the plurality of communication terminals, if the checking means determines that the generating of the print order is complete before the performance time measured by the measuring means exceeds a predetermined time period, and to send an e-mail describing a URL for accessing the Web page information to the one of the plurality of communication terminals, the performance time measured by the measuring means exceeds the predetermined time period before the checking means determines that the generating of the print order is complete.

2. The server apparatus according to claim 1, wherein the Web page information indicates a progress of the generating of the print order, when the one of the plurality of communication terminals has accessed the Web page with the URL described in the e-mail.

3. The server apparatus according to claim 1, wherein the predetermined time period is a time period from a start of the generation of the print order by the generating means to a time out of communication between the server apparatus and the one of the plurality of communication terminals.

4. The server apparatus according to claim 1 further comprising a transmission means for transmitting the print order generated by the generating means to an external print processing apparatus.

5. A communication method of a server apparatus which manages image data and receives a print request from one of a plurality of communication terminals via a network, comprising the steps of:

generating a print order based on the print request received from the one of the plurality of communication terminals;

measuring a performance time of the generating of the print order;

checking whether the generating of the print order is complete; and controlling to send Web page information related to the print order to the one of the plurality of communication terminals, if the checking step determines that the generating of the print order is complete before the performance time measured in the measuring step exceeds a predetermined time period, and to send an e-mail describing a URL for accessing the Web page information to the one of the plurality of communication terminals, if that the performance time measured in the measuring step exceeds the predetermined time period before the checking step determines that the generating of the print order is complete.

6. A computer-readable storage medium which stores a program causing a computer to execute a communication method of a server apparatus which manages image data and receives a print request from one of a plurality of communication terminals via a network, said program comprising the steps of:

generating a print order based on the print request received from the one of the plurality of communication terminals;

measuring a performance time of the generating of the print order;

checking whether the generating of the print order is complete; and controlling to send Web page information related to the print order to the one of the plurality of communication terminals, if the checking step determines that the generating of the print order is complete before the performance time measured in the measuring step exceeds a predetermined time period, and to send an e-mail describing a URL for accessing the Web page information to the one of the plurality of communication terminals, if the performance time measured in the measuring step exceeds the predetermined time period before the checking step determines that the generating of the print order is complete.

* * * * *

UNITED STATES PATENT AND TRADEMARK OFFICE
CERTIFICATE OF CORRECTION

| | | |
|---|---|---|
| PATENT NO. | : 7,409,431 B2 | Page 1 of 1 |
| APPLICATION NO. | : 10/660640 | |
| DATED | : August 5, 2008 | |
| INVENTOR(S) | : Kotaro Yamaguchi et al. | |

It is certified that error appears in the above-identified patent and that said Letters Patent is hereby corrected as shown below:

<u>COLUMN 14</u>:
        Line 55, "that" should be deleted.

Signed and Sealed this

Third Day of March, 2009

JOHN DOLL
*Acting Director of the United States Patent and Trademark Office*